United States Patent [19]

Reed et al.

[11] Patent Number: 5,103,083
[45] Date of Patent: Apr. 7, 1992

[54] POSITION SENSITIVE DETECTOR AND METHOD USING SUCCESSIVE INTERDIGITATED ELECTRODES WITH DIFFERENT PATTERNS

[75] Inventors: David A. Reed; Bruce H. Newcome, both of Redwood City, Calif.

[73] Assignee: Charles Evans & Associates, Redwood City, Calif.

[21] Appl. No.: 480,645

[22] Filed: Feb. 15, 1990

[51] Int. Cl.$^5$ .............................................. H01J 31/50
[52] U.S. Cl. ...................... 250/213 VT; 313/103 CM
[58] Field of Search ............ 250/213 VT; 313/103 M, 313/105 CM

[56] References Cited

U.S. PATENT DOCUMENTS

| | | | |
|---|---|---|---|
| 3,683,185 | 8/1972 | Muehllehner | 250/213 VT |
| 3,890,506 | 6/1975 | Berninger | 250/213 VT |
| 4,024,390 | 5/1977 | Bosserman et al. | 313/105 CM |
| 4,024,391 | 5/1977 | Bosserman et al. | 313/105 CM |
| 4,184,069 | 1/1980 | Bosserman | 313/105 CM |
| 4,555,731 | 11/1985 | Zinchuk | 250/213 VT |
| 4,718,761 | 1/1988 | Tsuchiya | 250/213 VT |
| 4,752,714 | 6/1988 | Sonneborn et al. | 313/103 CM |
| 4,767,207 | 8/1988 | Takiguchi | 250/213 VT |
| 4,947,031 | 8/1990 | Koishi et al. | 250/213 VT |

OTHER PUBLICATIONS

"Ultraviolet Spectrum of Quasi-Stellar Object 3c273", Arthur F. Davidsen, George F. Hartig, & William G. Fastie, Nature vol. 269, 15 Sep. 1977, pp. 203-206.

"Position-Sensitive Detection of Thermal Neutrons", Edited by Pierre Convert & J. Bruce Forsyth, pp. 1-46.

"Position-Sensitive Focal Plane Detectors for Electron (ESCA) Spectrometers", L. Asplund & U. Geluis, and P. A. Tove, S. A. Eriksson & Bingefors, Nuclear Instruments and Methods in Physics Research 226 (1984), pp. 204-208.

"Detection of Extreme UV and Soft X-Rays with Microchannel Plates: A Review", Oswald H. W. Siegmund and Roger F. Malina, Multichannel Image Detectors, vol. 2, pp. 253-275.

"Silicon Detectors: New Challenges", Jack T. Walton, Nuclear Instruments and Methods in Physics Research 226 (1984), pp. 1-11.

"Aeroball System and Energy-Dispersive Analysis: Important Industrial Applications of Silicon Detectors", P. A. Glasow, Nuclear Instruments and Methods in Physics Research 226 (1984), pp. 17-25.

"Applications of Silicon Detectors in High Energy Physics and Astrophysics", C. Damerell, Nuclear Instruments and Methods in Physics Research 226 (1984), pp. 26-32.

"Application of Si-Microstrip-Detectors in Medicine and Structural Analysis", R. Nowotny, Nuclear Instruments and Methods in Physics Research 226 (1984), pp. 34-39.

"Performance of Silicon Strip Detectors with 50 and 100 Lm Strip Distance", H. Boettcher, A. Donat, R. Leiste, G. Motz, U. Roeser et al., Nuclear Instruements and Methods in Physics Research 226 (1984), pp. 72-77.

"A Ge-Si Active Target for the Measurement of Short Lifetimes", S. R. Amendolia, G. Batignani et al., Nuclear Instruments and Methods in Physics Research 226 (1984), pp. 78-81.

"Manufacturing, Performance and New Developments in Silicon Counters in High Energy Physics", Paul Burger, Nuclear Instruments and Methods in Physics Research 226 (1984), pp. 112-116.

(List continued on next page.)

Primary Examiner—David C. Nelms
Assistant Examiner—S. Allen
Attorney, Agent, or Firm—Limbach & Limbach

[57] ABSTRACT

A position sensitive detector and method are disclosed wherein an image of incident radiation is detected and amplified and an accelerated charged image is produced corresponding spatially to the incident radiation. The accelerated charged image is successively impinged on successive pairs of interdigitated electrodes having different electrode patterns and the output of the electrodes is compared for determining the location of the charges making up the charged image.

16 Claims, 2 Drawing Sheets

OTHER PUBLICATIONS

"Semiconductor Position-Sensitive Detectors", V. Radeka, Nuclear Instruments and Methods in Physics Research 226 (1984), pp. 209-218.

"A Two-Dimensional Position-Sensitive Phoswich Detector", M. Bantel, R. G. Stokstad, Y. D. Chan and S. Wald, Nuclear Instruments and Methods in Physics Research 226 (1984), pp. 394-404.

"Position-Sensitive Detector Performance and Relevance to Time-Resolved Electron Energy Energy Loss Spectroscopy", Lee J. Richter and W. Ho, Rev. Sci. Instrum. 57(8), Aug. 1986, pp. 1469-1482.

"Simultaneous Subnanosecond Timing Information and 2D Spatial Informatoin from Imaging Photomultiplier Tubes", W. G. McMullan, S. Charbonneau and M. L. W. Thewalt, Rev. Sci. Instrum. 58(9), Sep. 1987.

"Wedge-and-Strip Anodes for Centroid-Finding Position-Sensitive Photon and Particle Detectors", C. Martin, P. Jelinsky, M. Lampton and R. F. Malina, Rev. Sci. Instrum. 52(7), Jul. 1981, pp. 1067-1074.

"Rocket-Borne Instrument with a High-Resolution Plate Detector for Planetary UV Spectroscopy", William E. McClintock, Charles A. Barth et al., Applied Optics, 1 Sep. 1982/vol. 21, No. 17, pp. 3071-3079.

"Ultraviolet Spectrograph Using Microchannel Plates", G. M. Lawrence and E. J. Stone, Rev. Sci. Instrum., vol. 46, No. 4, Apr. 1975.

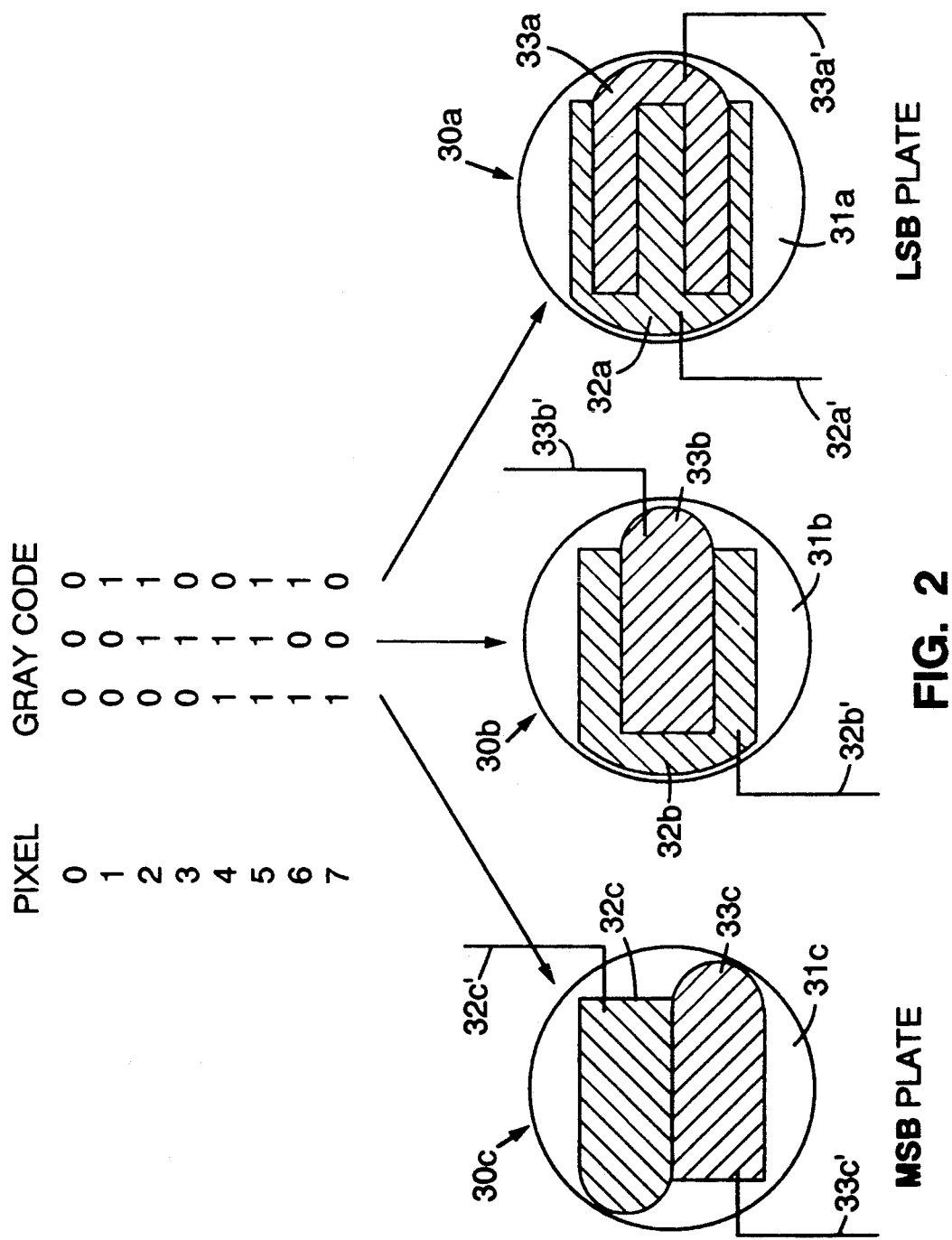

POSITION SENSITIVE DETECTOR AND METHOD USING SUCCESSIVE INTERDIGITATED ELECTRODES WITH DIFFERENT PATTERNS

This invention was made with Government support under Contract No. DE-AC03-89ER80742 awarded by the DOE. The Government has certain rights in this invention.

The present invention relates, in general, to a position sensitive detector and method, more particularly to a position sensitive detector incorporating a plurality of microchannel plates patterned with interdigitated electrodes.

BACKGROUND OF THE INVENTION

Position sensitive detectors (PSDs) are widely used for charged particle and photon spectroscopy as well as imaging applications. PSDs can be made largely independent of the exact forms of incident radiation. Most PSD configurations employ a tandem arrangement of microchannel plates (MCPs) which convert an incoming particle (ion or electron) to a burst of $10^6$–$10^7$ electrons concentrated in a few tens of square micrometers. In the case of photon radiation, the incident photon is converted to an electron pulse by a suitable photocathode preceding the MCPs. For highly energetic beams of charged or neutral particles, a thin conversion foil provides secondary electrons.

A variety of schemes have been employed to determine the position of each electron burst within the two-dimensional detector array. The two methods most commercially successful are (1) discrete channel detectors in which individual collectors are followed by their own dedicated pulse-processing electronics, and (2) charge division in which the electron burst is distributed among four take-off electrodes at the corners of a nominally rectangular resistive anode positioned behind the last microchannel plate. Other charge division schemes are possible, but the resistive anode is currently the most reliable and least expensive to produce.

In the discrete channel detector, pulse pair resolutions of 10 nsec are possible but as a practical matter, the total number of channels that can be assembled is very limited. Spatial resolution and cost can also be limiting factors. With the charge division technique, the electron burst position is calculated by comparing either the magnitude or the arrival time of the collected charge at the four electrode positions. Independent of the exact charge division method employed, pulse pair resolution for a given lateral resolution is about the same. For $256 \times 256$ pixels, deadtimes of approximately 1-2 $\mu$sec are routinely achievable.

The detector configuration consisting of the microchannel plates followed by a resistive anode is known as a resistive anode encoder (RAE). Commercial RAEs have deadtimes on the order of 1 $\mu$sec. This limits the useful linearity range to around $5 \times 10^4$–$1 \times 10^5$ cps. At or above these count rates, the detectors become highly non-linear and begin to effectively saturate limited strictly by the speed of the associated position computer electronics.

SUMMARY OF THE INVENTION

Broadly stated the present invention is directed to a position sensitive detection apparatus and method for imaging incident radiation, charged particles and/or energetic neutral particles wherein the radiation and/or charged particles are detected and an amplified and accelerated charged image produced which corresponds spatially to the incident radiation and/or charged particles. The accelerated charged image is successively impinged on at least one of a pair of interdigitated electrodes at a series of stages downstream in the accelerated direction of the charged image. The interdigitated electrodes at each successive impingement have different electrode patterns. After the stages, the charged image is collected; the electrodes impinged upon are compared; and the locations of the charges making up the charged image are determined.

In accordance with one aspect of this invention orthogonal pairs of electrodes at each stage are provided to determine both the X and Y location of the charges of the charged image.

In accordance with another aspect of this invention the electrode patterns include a broad pattern bisecting the accelerated charged image and finer patterns bisecting the electrodes of the next broader pattern. In a preferred aspect of the invention the finest pattern is arranged at the beginning stage.

In accordance with still another aspect of this invention the charged image is amplified at each of the stages of impingement.

In accordance with still another aspect of this invention a microchannel plate with orthogonal pairs of electrodes on its surfaces is provided at each stage for impingement and amplification of the charged image.

These features and aspects of the present invention will become more apparent upon a perusal of the following specification and claims taken in conjunction with the accompanying drawing wherein similar characters of reference represent similar elements in each of the several views.

BRIEF DESCRIPTION OF THE DRAWINGS

FIG. 2 is a schematic view showing electrode patterns and the Gray code for the pixels determinable with the patterns.

DESCRIPTION OF THE PREFERRED EMBODIMENT

Figure 1:
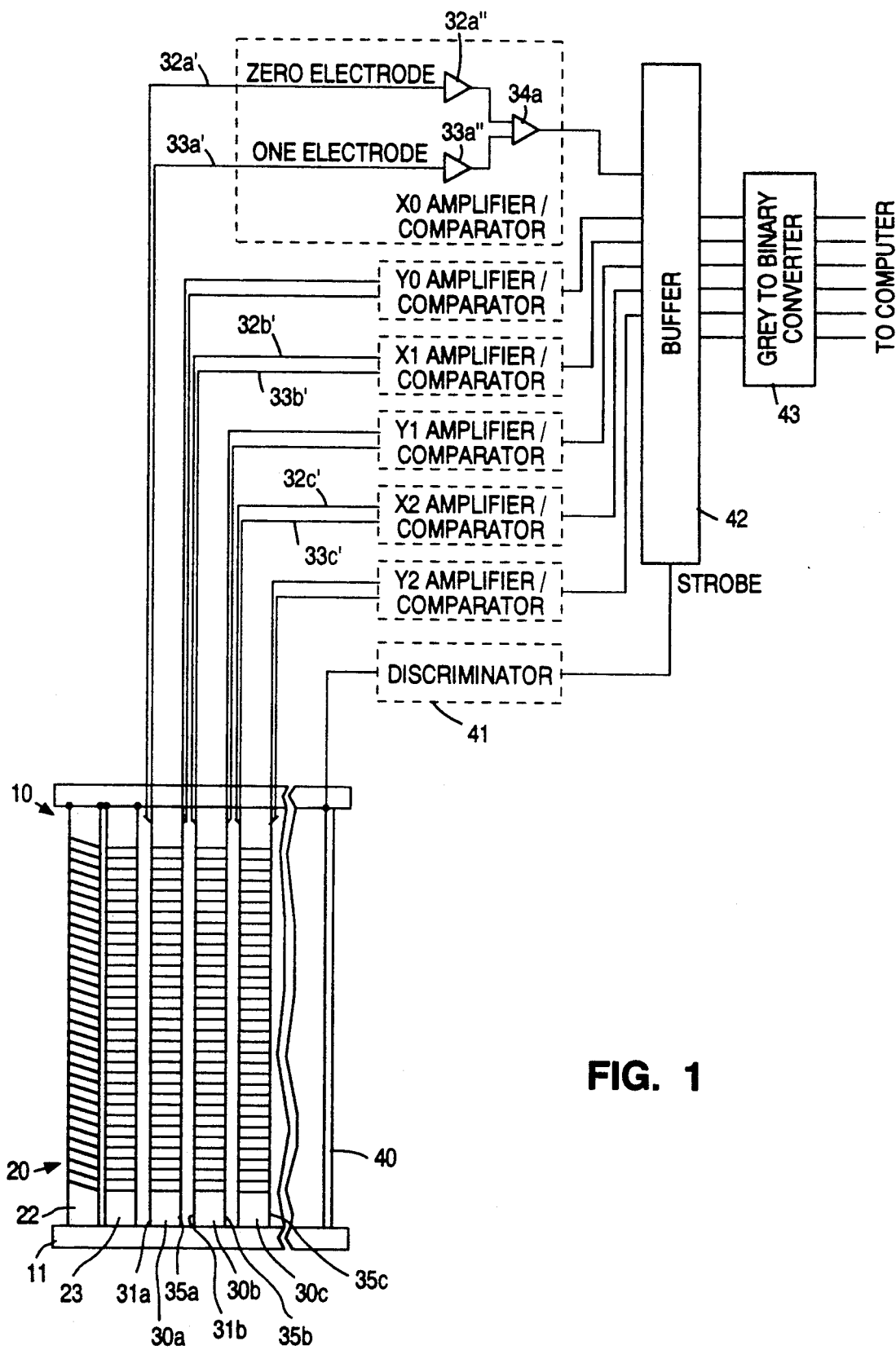
FIG. 1 is a schematic drawing, partly in a foreshortened elevational sectional form and partly in block diagram form, of the preferred embodiment of the invention.

Referring now to the drawings there is shown a position sensitive detector 10 in accordance with the preferred embodiment of the present invention. The detector 10 includes a vacuum chamber housing 11 for receiving an image of incident radiation, charged particles and/or energetic neutral particles at one end on the input face of a dual microchannel plate 20. From the microchannel plate 20 the image is passed through a series of microchannel plates 30a, b, c, d ... successively positioned downstream from the dual microchannel plate 20 toward a collection plate 40. Since the PSD 10 can include the appropriate desired number of microchannel plates 30 in the series, the PSD is shown foreshortened for purposes of illustration.

The dual microchannel plate 20 includes a chevron configuration of cascaded microchannel electron multiplier plates 22 and 23 such as a fused array of lead glass tubes or channels. Typical tube interior diameters are 10 $\mu$m with 15$\mu$m spacing between centers. The plate thickness (equivalently, the tube length) is approximately 0.5 mm, corresponding to a channel aspect ratio of 50. The interior of the tubes have a high secondary electron coefficient and are slightly conductive. A suitable photocathode can be provided preceding the dual microchannel plate 20 to convert photons to an electron burst and/or a thin foil can be provided to convert charged or neutral particles to secondary electrons.

A metallic electrode is vacuum evaporated on to both faces of each plate 22 and 23. By applying voltage across the microchannel plate surfaces, electric field is produced along each tube so that an electron entering a tube is accelerated toward the other end. When an electron strikes the wall, several electrons are emitted and each of these repeats the process. Single plate 22 can output $10^3$-$10^4$ electrons per incident electron. The second microchannel plate 23 accepting the output of the first plate 22 can provide an additional $10^3$ gain. The lateral position of the incident electrons is preserved.

The microchannel plates 30a-30c include input surfaces 31a-31c and an output surfaces 35a-35c, respectively. As shown in FIG. 2, each input surface 31a-31c includes a pair of thin film interdigitated electrodes 32a-32c and 33a-33c, respectively. Leads 32a'-32c' connect electrodes 32a-32c to amplifiers 32a"-32c", respectively, and leads 33a'-33c' connect electrodes 33a-33c to amplifiers 33a"-33c", respectively. The amplifiers for the two electrodes on each surface are connected to comparators 34a-34c.

The microchannel plates 30a-30c have output surfaces 35a-35c which include interdigitated electrodes corresponding to those on the respective input surfaces and similar amplifiers are connected to similar comparators. Only the amplifiers 32a" and 33a" and the comparator 34a for the input surface 31a of microchannel plate 30a are illustrated. The electrodes on the input surface and on the output surface when projected onto a common plane are orthogonal to one another.

The electrodes 32a-32c on input surfaces 31a-31c serve to determine the "X" position of an electron burst, and the electrodes on the output surfaces 35a-35c serve to determine the "Y" position.

The collection plate 40 is connected to an amplifier discriminator 41. The amplifier/comparator combination for all interdigitated electrodes and the discriminator 41 are connected to a buffer 42, then to a Gray to binary code converter 43 and then to a computer to compute the positions of all electron bursts.

In operation, the incident particle strikes the front surface of the dual microchannel plate 20 causing a burst of $10^6$-$10^7$ electrons to exit the rear surface of the second plate 23 for then passage through the microchannel plates 30a-30c and finally for striking tho metal collector plate 40. The time duration of the burst pulse striking the collector plate 40 is approximately 300 psec.

The electrode pairs fall in a sequence with successively finer patterns and each is connected to a comparator circuit. As a charge burst traverses the stack, it encounters at each surface 1 electrode of the pair, determining 1 digit of a Gray binary code. Each microchannel plate restores lost charge and the burst finally strikes the collection plate providing a strobe pulse to read out the comparator. For 2n pixels, only n comparators and n/2 microchannel plates are required.

As the burst exits the rear electron of the second plate 23, a recharge pulse is available while permitting the electron burst to proceed unimpacted. As the electron burst leaves the rear surface of each plate 30a-30c, a recharge pulse is generated in one of the two electrodes.

The same electrons then strike the succeeding microchannel plate and generate a burst pulse on its front face, and the process repeats. Each of the microchannel plates 30a-30c is operated with sufficient gain to overcome electron losses.

On the microchannels 30a-30c the recharge pulse will occur in the electrode half on which electrons strike the front or input plate surface, and a recharge pulse will occur in the electrode half from which the burst exits. The output state of the comparator circuits 34a-34c will correspond to the activated electrode. If the magnitude of the charge burst striking the collection plate 40 exceeds the threshold of discriminator 41, the comparator output state is recorded. For providing location information two binary decisions are provided, and they are made with separate signals. The collector 40 pulse passed through the amplifier discriminator 41 serves to decide if an event has occurred, and the comparators 34a-34c decide the lateral position.

Each microchannel plate surface provides one digit of binary code describing the pixel position. While the electrode pattern will follow the conventional binary counting system, the performance of the system can be significantly improve by employing the binary codes developed by Gray. FIG. 2 shows a one-dimensional 8 pixel encoder code with its interdigitated electrode patterns on plates 30a-30c, noting the most significant bit pattern and the least significant bit pattern.

The Gray binary system has the property that adjacent codes only differ in one digit and has important application in this invention. Any electron burst may straddle a divider between electrode pairs leading to an indeterminate comparator output with the Gray system. Since every microchannel plate surface corresponds to a digit, an electron burst of width 1 pixel can only encounter a divider strip at one surface in the stack, and so outputs are never indeterminate by more than 1 pixel. In fact, electron bursts up to 3 pixels wide will unconditionally generate correct codes.

In accordance with the preferred embodiment of the invention with a 25 mm square active area, 256 pixels means 100 $\mu$m per pixel The finest pattern has a center distance of 200 $\mu$m. A divider strip with 50$\mu$m will utilize 75 percent of the available charge and yet be practical to fabricate. The interelectrode capacitance of comparable wedge and strip anodes is approximately 100 pF; for the pulse length of the preferred embodiment, this corresponds to a few ohms impedance. Coating the microchannel plate surface and its metallization with a weakly-conductive overlay will ameliorate charging in the divider strip without affecting the impedance.

The burst will increase in diameter as it traverses the microchannels stack. For perfect comparators and symmetric spreading function, the burst diameter must always be 1 pixel less than the pattern repeat distance to insure correct coding. It is therefore advantageous to place the finest patterns closer to the amplifier chevron dual microchannel plate 20. Preferably, the burst diameter should not exceed 10 pixels. The least spreading is accomplished by butting each microchannel plate against its neighbor, but this complicates connection of the electrodes. Spreading will satisfactorily be small for spacing between the microchannel plates 30a-30c of approximately 100 $\mu$m.

The electron burst will also spread in the time domain. A 5 microchannel plate stack operated at moderate gain will produce a pulse width of about 500 psec. A reduced gain stack in accordance with the preferred embodiment will generate pulses of about 1 to 3 nsec duration. Furthermore, pulses from succeeding microchannel plate surfaces will occur later in time. The transit time from electron velocities can be estimated since an electron with 10 eV kinetic energy travels 1 cm in 5 nsec. For this magnitude of transit time, differences can be compensated with cable length and will not impact pulse pair resolution.

While the preferred embodiment of this invention incorporates successive microchannel plates, other structures can be utilized. For example, an array of holes can be drilled in silicon which is then provided with polyamide films that will produce secondary electrons.

While the invention has been described in terms of a preferred embodiment, it will be apparent to those skilled in the art that numerous modifications can be made thereto without departing from the spirit and scope of the invention. It is intended that these modifications fall within the spirit and scope of the appended claims.

We claim:

1. A position sensitive detector for imaging incident radiation, charged particles and/or energetic neutral particles comprising, in combination:
   means for detecting said radiation and/or charged particles and producing an amplified and accelerated charged image which corresponds spatially to the incident radiation and/or charged particles,
   successive means for impingement of said accelerated charged image downstream in the accelerated direction of said charged image from said detecting and producing means,
   each of said successive impingement means including at least a pair of interdigitated electrode means,
   said interdigitated electrodes at said successive impingement means having different electrode patterns,
   a collector downstream of said successive impingement means for collecting the charged image, and
   means for comparing the electrodes of each pair for impingement when the charged image is collected and determining the location of the charges making up the charged image.

2. The detector of claim 1 wherein said different electrode patterns include two sets of patterns orthogonal to one another.

3. The detector of claim 2 wherein each said set of patterns includes a broad pattern bisecting said accelerated charged image and finer patterns bisecting the electrodes of a broader pattern.

4. The detector of claim 1 wherein said different electrode patterns include finer patterns on each successive impingement means in the upstream direction.

5. A position sensitive detector for imaging incident radiation, charged particles and/or energetic neutral particles comprising, in combination:
   means for detecting said radiation and/or charged particles and producing an amplified and accelerated charged image which corresponds spatially to the incident radiation and/or charged particles,
   successive means for impingement of said accelerated charged image downstream in the accelerated direction of said charged image from said detecting and producing means,
   each of said successive impingement means including at least a pair of interdigitated electrode means,
   said interdigitated electrodes at said successive impingement means having different electrode patterns including two sets of patterns orthogonal to one another,
   each said set of patterns including a broad pattern bisecting said accelerated charged image and finer patterns bisecting the electrodes of a broader pattern,
   said pairs of said electrodes having different and finer patterns on each successive impingement means in the upstream direction,
   a collector downstream of said successive impingement means for collecting the charged image, and
   means for comparing the electrodes of each pair for impingement when the charged image is collected and determining the location of the charges making up the charged image.

6. A position sensitive detector for imaging incident radiation, charged particles and/or energetic neutral particles comprising, in combination:
   means for detecting said radiation and/or charged particles and producing an amplified and accelerated electron image which corresponds spatially to the incident radiation and/or charged particles,
   a plurality of microchannel plates positioned successively downstream from said detecting and producing means in the direction of the accelerated electron image,
   each microchannel plate having image input and output surfaces with at least one of said surfaces having at least a pair of interdigitated electrodes,
   said pairs of said electrodes having different patterns,
   a collector downstream of said microchannel plates, and
   means for comparing the electrodes of each pair of electrodes for impingement when the electron image is collected and determining the location of the electrons making up the electron image.

7. The detector of claim 6 wherein said different electrode patterns include two sets of patterns orthogonal to one another.

8. The detector of claim 7 wherein each said set of said patterns includes a broad pattern bisecting said accelerated electron image and finer patterns bisecting the electrodes of a broader pattern.

9. The detector of claim 1 wherein said different electrode patterns include finer patterns on each successive microchannel plate in the upstream direction.

10. A position sensitive detector for imaging incident radiation, charged particles and/or energetic neutral particles comprising, in combination:
    means for detecting said radiation and charged particles and producing an amplified and accelerated electron image which corresponds spatially to the incident radiation and/or charged particles,
    a plurality of microchannel plates positioned successively downstream in the direction of the accelerated electron image from said detecting and producing means,
    each microchannel plate having image input and output surfaces with at least a pair of interdigitated electrodes on each of said surfaces,
    said electrodes on said input surface of a given plate being orthogonal to said electrodes on said output surface of said given plate when projected onto a common plane, said pairs of said electrodes having different and finer patterns on each successive plate in the upstream direction, a collector downstream of said microchannel plates, and means for comparing the electrodes of each pair of electrodes for impingement when the electron image is collected and determining the location of the electrons making up the electron image.

11. The method of detecting the positions of the parts of an image of incident radiation, charged particles and/or energetic neutral particles comprising the steps of:

detecting said radiation and/or charged particles and producing an amplified and accelerated charged image which corresponds spatially to the incident radiation and/or charged particles, successively impinging said accelerated charged image on at least pairs of interdigitated electrodes having different electrode patterns and located downstream in the accelerated direction of said charged image, collecting the charged image after said successive impingement, comparing the electrodes of each pair for impingement when the charged image is collected and determining the location of the charges making up the charged image.

12. The method of claim 11 including providing different electrode patterns including two sets of patterns orthogonal to one another.

13. The method of claim 12 including providing in each said set of patterns a broad pattern bisecting said accelerated charged image and finer patterns bisecting the electrodes of a broader pattern.

14. The method of claim 13 including providing finer patterns at each successive impingement location in the upstream direction.

15. The method of detecting the positions of the parts of an image of incident radiation, charged particles and/or energetic neutral particles comprising the steps of:

detecting said radiation and/or charged particles and producing an amplified and accelerated charged image which corresponds spatially to the incident radiation and/or charged particles, at a series of stages successively impinging said accelerated charged image on at least pairs of interdigitated electrodes having different electrode patterns and located downstream in the accelerated direction of said charged image, amplifying said charged image at each of said stages, collecting the charged image after the last of said stages, comparing the electrodes of each pair for impingement when the charged image is collected and determining the location of the charges making up the charged image.

16. The method of detecting the positions of the parts of an image of incident radiation, charged particles and/or energetic neutral particles comprising the steps of:

detecting said radiation and/or charged particles and producing an amplified and accelerated charged image which corresponds spatially to the incident radiation and/or charged particles, successively impinging said accelerated charged image on at least pairs of interdigitated electrodes having different electrode patterns and located downstream in the accelerated direction of said charged image and with two sets of patterns orthogonal to one another including in each said set of patterns a broad pattern bisecting said accelerated charged image and finer patterns bisecting the electrodes of a broader pattern with the finer patterns at each successive impingement location in the upstream direction, collecting the charged image after said successive impingement, comparing the electrodes of each pair for impingement when the charged image is collected and determining the location of the charges making up the charged image.

* * * * *